Jan. 24, 1950 R. G. LE TOURNEAU 2,495,336
EARTHWORKING SCRAPER
Filed April 27, 1946 3 Sheets-Sheet 3

INVENTOR.
R. G. LeTourneau
BY
ATTYS

Patented Jan. 24, 1950

2,495,336

UNITED STATES PATENT OFFICE 2,495,336

EARTHWORKING SCRAPER

Robert G. Le Tourneau, Peoria, Ill., assignor to R. G. Le Tourneau, Inc., Stockton, Calif., a corporation of California Application April 27, 1946, Serial No. 665,578

8 Claims. (Cl. 37—129)

This invention relates to, and it is an object to provide, an improved earth working scraper of the type which is operative to dig, carry, unload, and spread earth; the scraper—in the present embodiment—being self-propelled by a tractor included in unitary relation therein.

Another object of this invention is to provide a scraper which includes an earth carrying bowl of novel construction; such bowl being simplified and of relatively light weight, but of substantial strength and durability.

A further object of the invention is to provide, in a scraper having a vertically adjustable earth carrying bowl, a similarly adjustable front apron cooperating with the open forward end of said bowl in earth retaining relation, and a generally U-shaped, rearwardly opening yoke straddling the bowl and secured thereto in draft relation; a pair of electric winch units mounted on the yoke at the front and including separate cable systems connected in lifting relation to the bowl and front apron, respectively.

An additional object of the invention is to provide a novel cable system between the bowl and corresponding electric winch unit on the yoke; said cable system being arranged to exert a positive equalized lift on the bowl at opposite sides thereof.

It is also an object of the invention to provide a scraper, of the type described, wherein the apron may be lifted, by the corresponding cable system, to a relatively high point, as is desirable to permit of fast and unrestricted unloading of the bowl.

A further object of the invention is to provide a practical earth working scraper, and one which will be exceedingly effective for the purpose for which it is designed.

These objects are accomplished by means of such structure and relative arrangement of parts as will fully appear by a perusal of the following specification and claims.

In the drawings:

Fig. 4 is a cross section on line 4—4 of Fig. 2.

Fig. 5 is a diagrammatic illustration of the bowl lift cable system.

Figure 1:
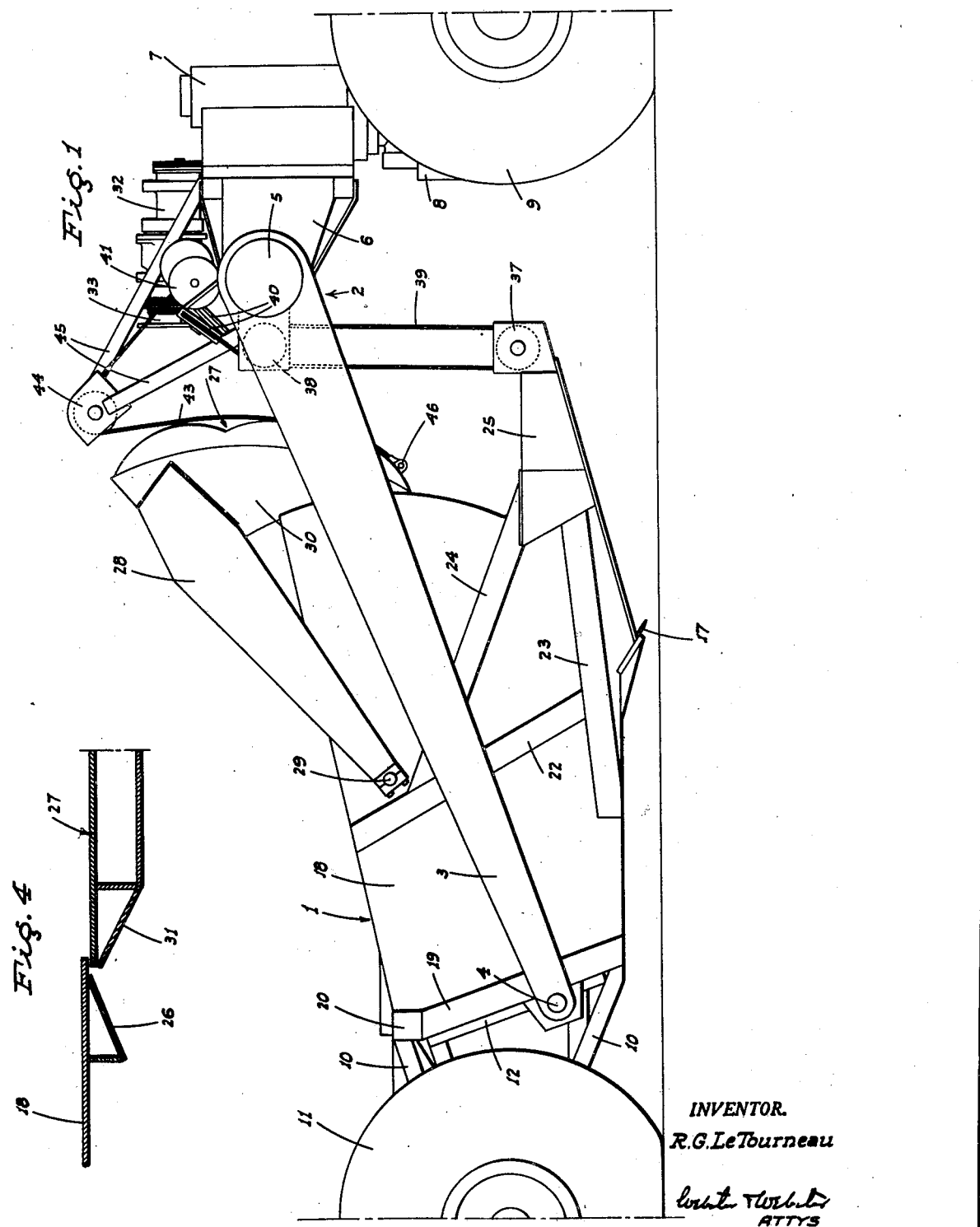
Fig. 1 is a side elevation of the scraper, with the bowl in unloading position and the front apron raised.

Referring now more particularly to the characters of reference on the drawings, the scraper comprises a bowl, indicated generally at 1, and hereinafter described in greater detail. The bowl is straddled, from the front, by means of a heavy-duty draft yoke, indicated generally at 2, such draft yoke including transversely spaced, rearwardly and downwardly inclined side beams 3 pivotally connected, at their rear ends, to the corresponding end of the bowl 1, adjacent the bottom of the latter, as at 4. At their forward ends, and ahead of the bowl, the side beams 3 are rigidly connected together by a heavy-duty tubular cross beam 5. Centrally of its ends the cross beam 5 is formed with a rigid, forwardly projecting attachment neck 6 which is coupled in rigid relation to a power steering unit 7 mounted on and upstanding from the deck 8 of a tractor at the rear end of the latter; the tractor being of two-wheel type, with the wheels shown at 9.

At its rear end the scraper bowl 1 is formed with a rigid, rearwardly projecting, open frame structure 10, which supports a pair of transversely spaced rear wheels 11. The pairs of wheels 9 and 11 are of relatively large diameter and are provided with pneumatic tires.

The bowl is provided, within the same, with a longitudinally movable rear end, or earth push-out, gate 12 which includes a blade or sweep 13 which rides on the bottom 14 of said bowl. The rear end gate 12 is formed, on the back thereof, with a push bar assembly or frame 15 power actuated, to advance or retract said rear end gate, by power mechanism supported within the frame structure 10, but not here shown.

The bottom 14 of the bowl is of reinforced construction and at its forward edge is formed with a blade base 16, on which a transverse cutting or digging blade 17 is attached.

The bowl 1 includes metal side plates 18 which are secured in connection with, and upstand from, opposite sides of the bottom 14 of said bowl. Each side plate 18 is formed in unitary relation with a stiffening frame structure which comprises the following:

At the rear end and outside thereof each side plate is secured to an upstanding post 19; said posts being connected, at their upper ends, by a top back beam 20. A top side beam 21 is fixed on each side plate 18 on the inside and extends along the upper edge of said plate.

An upstanding, intermediate post 22 is affixed to each side plate 18 on the outside thereof, and stiffening beams 23 and 24, similarly affixed to the outside of each side plate, extend forwardly from the intermediate post 22, to which they are also connected. Each stiffening beam 23 is disposed longitudinally adjacent the bottom of the bowl, whereas the stiffening beam 24 extends diagonally at a downward and forward slope from the intermediate post 22. The pair of stiffening beams 23 and 24 on each side of the bowl project forwardly ahead of the latter, and form a part of forwardly projecting bowl lifting arms 25 on opposite sides of said bowl.

At their forward ends the side plates 18 are convex, as shown, and said plates include, adjacent said forward ends and on the inside thereof, arcuate reinforcing or stiffening ribs 26, said ribs being connected to and extending downward from the top side beams 21 a substantial distance; i. e. to approximately the point of intersection with the corresponding diagonal stiffening beams 24. The ribs 26 are of such cross sectional configuration, as shown in Fig. 4, that they feather forwardly relative to the corresponding side plates.

By reason of the above described construction of the bowl 1, it is simplified and of relatively light weight but is strong and durable. Additionally, the stiffening frame structure, as employed in connection with each of the side plates 18, makes possible the elimination of the conventional arch or A-frame which connects opposite side plates of scraper bowls at the forward ends of the latter. The side plates of the bowl in the present scraper are unconnected above the bottom of the bowl from their forward ends to adjacent their rear ends. This simplifies construction, reduces weight, and improves the operator's vision of the load.

The scraper includes, in cooperation with the initially open, forward end of the bowl 1, a vertically swingable apron 27 which includes side arms 28 at opposite ends thereof; said side arms extending rearwardly alongside the bowl to pivotal connection at their rear ends with the side plates 18 adjacent the upper edges thereof, as at 29. The apron side arms 28 work or swing in a vertical plane between the side beams 3 of the yoke 2, and adjacent side plates 18 of the bowl.

The apron 27 includes side wings 30 of double-wall construction, as shown in Fig. 4; the rearward end portion of the inner wall of each of said side wings being feathered laterally out, as at 31, to the rear edge of the corresponding outer wall.

Figure 2:
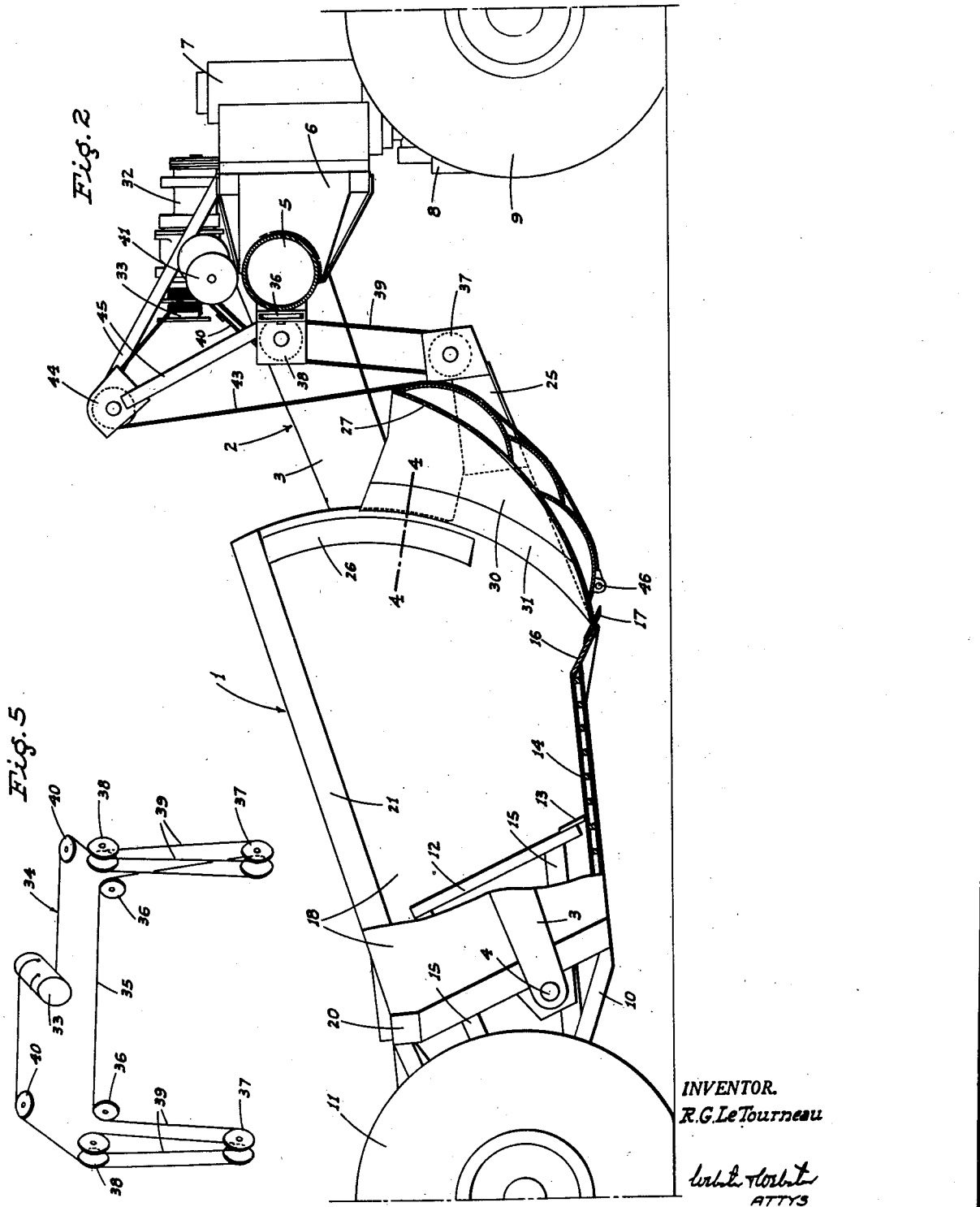
Fig. 2 is a side elevation, mainly in section, showing the bowl in transport position, and the front apron closed.
Figure 3:
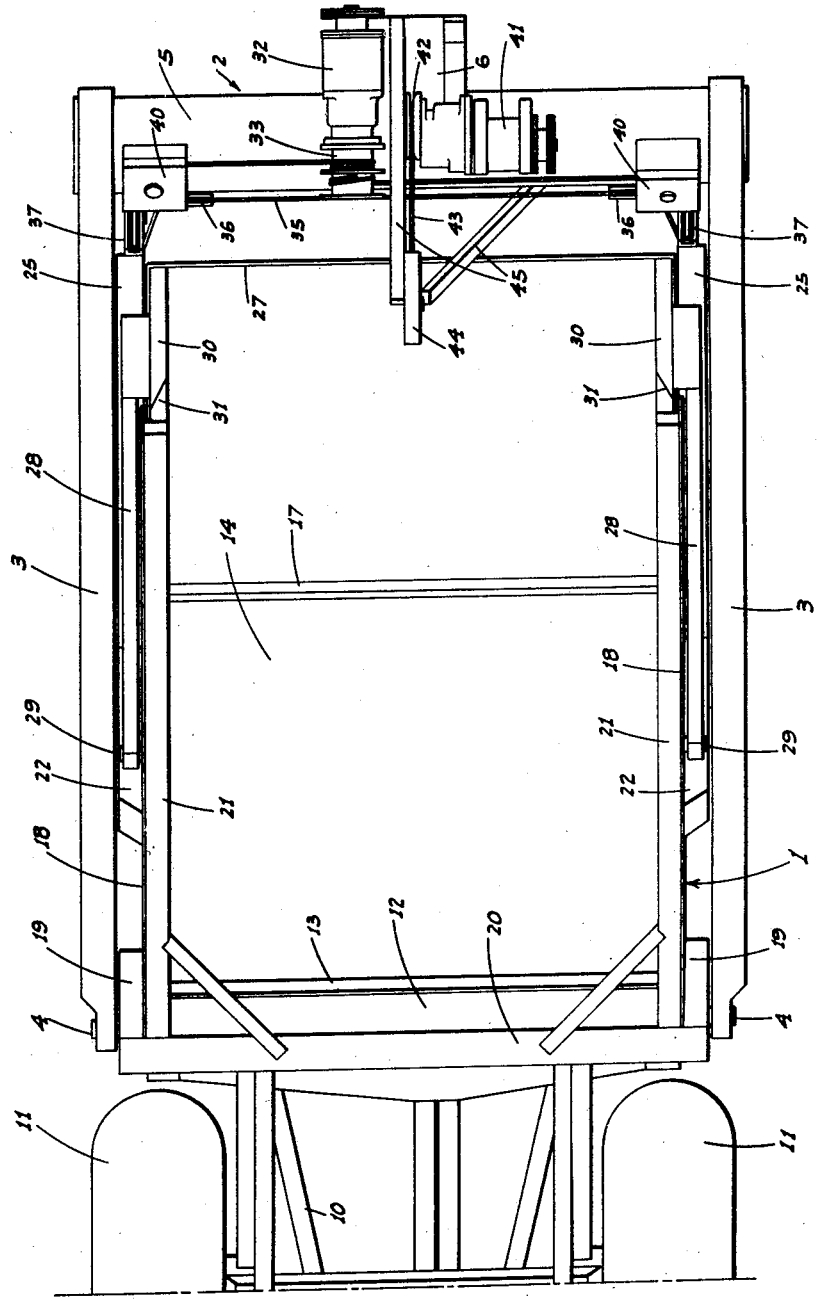
Fig. 3 is a plan view of the scraper.

The apron 27 is vertically swingable from a closed, dirt retaining position, as shown in Fig. 2, to a raised open position, as shown in Fig. 1. The apron is at least partially open when the bowl 1 is lowered for digging and loading of earth; is fully closed when the bowl is raised for transport; and is raised to open position when the rear endgate 12 is advanced to discharge a load from the bowl and out of its forward end.

Raising and lowering of the bowl 1, and the apron 27, is accomplished by means of the following power mechanism:

A reversible electric winch unit 32 is mounted on the neck 6 and includes a double drum 33 disposed above the cross beam 5, with the axis of said drum horizontal and extending lengthwise of the scraper. The electric winch unit 32, through the medium of the double drum 33, operates a bowl lift cable system which comprises a single length of cable, indicated at 34, reeved as follows, and as shown diagrammatically in Fig. 5;

A cross reach 35 extends between direction-changing sheaves 36 mounted on the cross beam 5, adjacent opposite ends thereof. From said direction-changing sheaves 36 opposite portions of the cable are reeved back and forth between pairs of sheaves 37 and 38 fixed on the forward ends of the bowl lift arms 25 and corresponding points on the cross beam 5 to form transversely spaced block and tackle systems 39. From one of the upper pairs of sheaves 38 opposite end portions of the cable extend about direction changing sheaves 40 on the cross beam 5 and thence extend to, and are connected in the same wound relation with, corresponding sides of the double drum 33. Thus, upon operation of the electric winch unit 32 in one direction or the other, the block and tackle systems 39 are either shortened or lengthened, to raise or lower, respectively, the bowl 1.

By reason of the described bowl lifting cable system the lift, as imparted to the bowl through the forwardly projecting bowl lifting arms 25, is equalized at all times, whereby to maintain the cutting blade 17 level.

Another reversible electric winch unit 41 is mounted on the cross beam 5 to one side of the winch unit 32, and includes a relatively narrow single cable drum 42; the latter being disposed with its axis extending transversely of the scraper.

An apron lift cable 43 is connected to the drum 42 and thence extends, at an upward and rearward incline, over a direction-changing sheave 44 mounted on an upstanding sheave-supporting frame 45 which projects upwardly from the cross beam 5. The sheave 44, while being disposed at an elevated point, is positioned so that the apron 27 may swing upwardly past the same without obstruction. From the sheave 44 the apron lift cable 43 extends downwardly, and normally engages across the apron on the front thereof to a cable anchor 46 on said apron adjacent its lower edge. Upon actuation of the electric winch unit 41 in one direction or the other, the apron 27 is either raised or lowered. As the apron lift cable 43 is attached to the apron adjacent its lower edge, the apron can be lifted to an open position wherein it is disposed at a relatively high point without the sheave 44 being mounted high above the cross beam 5.

The reversible electric winch units 32 and 41 each include a reduction gear box and an automatic brake which is normally set to prevent over-running, but which releases when the unit is energized. The winch units 32 and 41 are included in an electric control circuit which leads forwardly to the tractor and there includes switching mechanism under the control of the operator, whereby said units may be selectively and reversibly energized; said circuit deriving its electrical energy from a heavy-duty generator on the tractor and driven by the tractor engine.

For the purpose of clarity the lead wires of the circuit are omitted from the present drawings.

Accurate and selective positioning of the bowl 1 and the apron 27 can be accomplished, under the control of the operator, by means of the described power mechanisms which include the reversible electric winch units 32 and 41; the adjustments of said bowl and apron being accomplished smoothly and rapidly, as is desirable toward effective and economical functioning of the scraper.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a scraper which includes a bowl, wheels supporting the bowl adjacent its rear end, a draft yoke straddling the bowl from the front, said yoke including a cross beam at the front, means pivoting the legs of the yoke in connection with the bowl to the rear of its forward end for vertical adjustment of said bowl, and means adapted to couple a tractor to the yoke cross beam in draft relation; a reversible power winch unit, including a prime mover, mounted on the yoke cross beam intermediate its ends, and a lift cable system connected between the power winch unit and the bowl adjacent the forward end of the latter; said lift cable system including a single length of cable having end portions reversely connected to the winch unit and thence extending transversely of the direction of travel in opposite directions from the winch unit, sheave means guiding other portions of the cable intermediate its ends to form transversely spaced block and tackle units, said units being connected between the yoke and bowl on opposite sides thereof, there being a cross run in the cable between said block and tackle units, and sheave means guiding the latter.

2. In a scraper which includes a bowl, wheels supporting the bowl adjacent its rear end, a draft yoke straddling the bowl from the front, said yoke including a cross beam at the front, means pivoting the legs of the yoke in connection with the bowl to the rear of its forward end for vertical adjustment of said bowl, and means adapted to couple a tractor to the yoke in draft relation; a reversible power winch unit, including a prime mover, mounted on the yoke cross beam intermediate its ends, and a lift cable system connected between the power winch unit and the bowl adjacent the forward end of the latter; said lift cable system comprising a single length of cable including a cross run disposed ahead of the bowl, transversely spaced direction-changing sheaves on the forward portion of the yoke and over which sheaves the cable extends at opposite ends of said cross run, transversely spaced block and tackle units formed with portions of the cable beyond said sheaves and connected between the yoke and the bowl on opposite sides, and opposite end portions of the cable extending transversely of the direction of travel and toward each other in guided relation from the block and tackle units to the winch unit, the latter including a cable drum to which said opposite end portions of the cable are reversely connected.

3. In a scraper which includes a bowl, wheels supporting the bowl adjacent its rear end, a draft yoke straddling the bowl from the front, said yoke including a cross beam at the front, means pivoting the legs of the yoke in connection with the bowl to the rear of its forward end for vertical adjustment of said bowl, a vertically adjustable apron mounted on the bowl in cooperative relation to the initially open forward end of the same, and means adapted to couple a tractor to the yoke cross beam in draft relation; a pair of reversible power winch units mounted on the yoke cross beam, a lift cable system connected between one winch unit and the bowl, and another lift cable system connected between the other winch unit and the apron.

4. In a scraper which includes a bowl, wheels supporting the bowl adjacent its rear end, a draft yoke straddling the bowl from the front, said yoke including a cross beam at the front, means pivoting the legs of the yoke in connection with the bowl to the rear of its forward end for vertical adjustment of said bowl, a vertically adjustable apron mounted on the bowl in cooperative relation to the initially open forward end of the same, and means adapted to couple a tractor to the yoke cross beams in draft relation; a pair of reversible power winch units mounted on the yoke cross beam, a lift cable system connected between one winch unit and the bowl, and another lift cable system connected between the other winch unit and the apron; there being an upstanding frame structure mounted in connection with the yoke at the front, and a direction-changing sheave on said frame structure at the top and above the apron, said other lift cable system including a cable leading from said other winch unit upwardly over the direction-changing sheave and thence downwardly to connection with the apron.

5. A scraper as in claim 4 in which the cable leading downwardly from said sheave connects with the apron at a point adjacent its lower edge.

6. In a scraper which includes a bowl, wheels supporting the bowl adjacent its rear end, a draft yoke straddling the bowl from the front, said yoke including a crossbeam at the front, means pivoting the legs of the yoke in connection with the bowl to the rear of its forward end for vertical adjustment of said bowl, a vertically adjustable apron mounted on the bowl in cooperative relation to the initially open forward end of the same, and means adapted to couple a tractor to the yoke cross beam in draft relation; a pair of reversible electric power winch units mounted on the yoke cross beam, each winch unit including a cable drum, a lift cable system connected between the drum of one winch unit and the bowl, and another lift cable system connected between the drum of the other winch unit and the apron.

7. In a scraper which includes a bowl, wheels supporting the bowl adjacent its rear end, a draft yoke straddling the bowl from the front, said yoke including a cross beam at the front, means pivoting the legs of the yoke in connection with the bowl to the rear of its forward end for vertical adjustment of said bowl, a vertically adjustable apron mounted on the bowl in cooperative relation to the initially open forward end of the same, and means adapted to couple a tractor to the yoke cross beam in draft relation; a pair of reversible power winch units mounted in connection with a substantially central portion of said yoke cross beam, the tractor coupling means being relatively closely disposed to said winch units, a lift cable system connected between one winch unit and the bowl, and another lift cable system connected between the other winch unit and the apron.

8. A scraper, as in claim 3, in which the winch units each include a cable drum; the winch units being mounted so that the axis of the cable drum of one winch unit extends longitudinally of the direction of travel, while the axis of the cable drum of the other winch unit extends transversely of the direction of travel; said first named lift cable system including a transverse pull lead connected to the drum of said one winch unit, and said other lift cable system including a longitudinal pull lead connected to the drum of said other winch unit.

ROBERT G. LE TOURNEAU.

REFERENCES CITED

The following references are of record in the file of this patent:

UNITED STATES PATENTS

| Number | Name | Date |
|---|---|---|
| 377,523 | Kilborn | Feb. 7, 1888 |
| 872,439 | Livengood | Dec. 3, 1907 |
| 1,530,779 | Le Tourneau | Mar. 24, 1925 |
| 1,598,864 | Le Tourneau | Sept. 7, 1926 |
| 2,050,856 | Peterson | Aug. 11, 1936 |
| 2,083,307 | Schultz | June 8, 1937 |
| 2,224,438 | Le Bleu | Dec. 10, 1940 |
| 2,257,992 | Vaughn | Oct. 7, 1941 |
| 2,302,335 | Low | Nov. 17, 1942 |
| 2,306,066 | Le Bleu | Dec. 22, 1942 |